(12) United States Patent  
Fan

(10) Patent No.: US 9,781,252 B2  
(45) Date of Patent: Oct. 3, 2017

(54) INFORMATION PROCESSING METHOD, SYSTEM AND MOBILE TERMINAL

(71) Applicant: Lenovo (Beijing) Co., Ltd., Beijing (CN)

(72) Inventor: Lifeng Fan, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 145 days.

(21) Appl. No.: 14/083,090

(22) Filed: Nov. 18, 2013

(65) Prior Publication Data

US 2014/0141833 A1    May 22, 2014

(30) Foreign Application Priority Data

Nov. 20, 2012   (CN) .......................... 2012 1 0472821

(51) Int. Cl.  
    *H04M 1/725*       (2006.01)
(52) U.S. Cl.  
    CPC .... *H04M 1/72597* (2013.01); *H04M 2250/12* (2013.01)
(58) Field of Classification Search  
    None  
    See application file for complete search history.

(56) References Cited

U.S. PATENT DOCUMENTS

2009/0061841 A1\* 3/2009 Chaudhri .......... H04M 1/72527  
                                                       455/420  
2009/0265671 A1\* 10/2009 Sachs et al. .................. 715/863  
2010/0029328 A1\* 2/2010 Kuo ........................ H04M 1/22  
                                                       455/556.1

(Continued)

FOREIGN PATENT DOCUMENTS

CN    101674368 A    3/2010  
CN    102413214 A    4/2012

(Continued)

OTHER PUBLICATIONS

McCann, touch screens, 2012 http://scienceline.org/2012/01/okay-but-how-do-touch-screens-actually-work/.\*

(Continued)

*Primary Examiner* — Ping Hsieh  
*Assistant Examiner* — James Yang  
(74) *Attorney, Agent, or Firm* — Harness, Dickey & Pierce, P.L.C.

(57) ABSTRACT

The invention provides an information processing method, system and a mobile terminal, which can detect a motion trajectory of the mobile terminal after the mobile terminal receives a call request, and execute a first process when the motion trajectory meets a preset condition. It can be seen that, in the invention, whether a user will answer the call request is determined by the judgment to the motion trajectory of the mobile terminal after the call request is received. After it is determined that the user will answer the call request, the processes, such as automatically answering the call request, closing a screen touching function of a touch screen, or adjusting screen brightness, can be executed, so that the user does not need to perform any manual operation, which on one hand, improves execution efficiency, and on the other hand, avoids a misoperation caused by a manual operation.

18 Claims, 3 Drawing Sheets

(56) References Cited

U.S. PATENT DOCUMENTS

2010/0278345 A1\* 11/2010 Alsina et al. ................. 380/283
2011/0163955 A1\* 7/2011 Nasiri et al. .................. 345/158

FOREIGN PATENT DOCUMENTS

| CN | 102510423 A | 6/2012 |
| CN | 102664995 A | 9/2012 |
| EP | 2111021 A1 \* | 10/2009 |
| WO | WO 2013/055380 \* | 4/2013 |

OTHER PUBLICATIONS

Chinese Office Action mailed Mar. 19, 2015 regarding Chinese Application No. 201210472821.6. Translation provided by Unitalen Attorneys at Law.

\* cited by examiner

INFORMATION PROCESSING METHOD, SYSTEM AND MOBILE TERMINAL

This application claims priority to Chinese patent application No. 201210472821.6 titled "Information processing method, system and a mobile terminal" and filed with the State Intellectual Property Office on Nov. 20, 2012, which is incorporated herein by reference in its entirety.

FIELD OF THE INVENTION

The invention relates to the field of mobile terminal technique, and particularly to an information processing method, system and a mobile terminal.

BACKGROUND OF THE INVENTION

With the development of technology, people use a mobile terminal such as a mobile phone more frequently.

During the use of a mobile phone, if a call request from another mobile phone is received, a user will firstly press an answer key of the mobile phone (or perform an screen touching operation) and then answer the call. However, before answering the call, the user needs to perform some processes, such as answering the call or closing a screen touching function of the touch screen, all of which need to be operated manually by the user. Therefore, it may be understood that, the possibility of a misoperation to the mobile phone by the user during a call request will be increased greatly.

Therefore, a problem to be solved urgently is how to reduce misoperations by the user that occurred during an operation after the mobile terminal receives a call request.

SUMMARY OF THE INVENTION

In order to solve the above technical problem, embodiments of the invention provide an information processing method, system and a mobile terminal, so as to reduce misoperations by the user that occurred during the operations after the mobile terminal receives a call request. Technical solutions are as follows.

An information processing method applied to a mobile terminal, the mobile terminal including a first sensing unit, the method including:

receiving, after a call request is received, a plurality of physical parameters detected by the first sensing unit;

determining a motion trajectory of the mobile terminal after the call request is received, according to the plurality of physical parameters; and executing a first process when the motion trajectory meets a first preset condition.

Preferably, the first sensing unit is a gravity accelerometer or a gyroscope, and in the case where the first sensing unit is the gravity accelerometer, the physical parameters are three-dimensional acceleration components in a three-dimensional space; and in the case where the first sensing unit is the gyroscope, the physical parameters are three-dimensional displacements of the gyroscope in the three-dimensional space.

Preferably, the first process includes:
answering the call request,
adjusting brightness of a display screen of the mobile terminal, and/or
closing a screen touching function of a touch screen of the mobile terminal.

Preferably, the mobile terminal further includes a second sensing unit, and the step of executing a first process when the motion trajectory meets a first preset condition includes:

executing the first process when the motion trajectory meets the first preset condition and a first parameter sensed by the second sensing unit meets a second preset condition.

Preferably, the second sensing unit is a light sensor, the first parameter is an ambient light intensity value, and the second preset condition is that the ambient light intensity value is less than a first threshold.

Preferably, the second sensing unit is a capacitive screen, the first parameter is the induced charge quantity by the capacitive screen, and the second preset condition is that the induced charge quantity by the capacitive screen is greater than a second threshold.

Preferably, the method further includes: saving the motion trajectory; and in the case where a plurality of motion trajectories that have been saved do not meet the first preset condition and their differences from the first preset condition are less than a first difference, modifying the first preset condition according to the plurality of motion trajectories.

An information processing system included in a mobile terminal, the mobile terminal includes a first sensing unit, the system including: a physical parameter reception unit, a motion trajectory determination unit and a first process execution unit, the physical parameter reception unit is configured to receive, after a call request is received, a plurality of physical parameters detected by the first sensing unit;

the motion trajectory determination unit is configured to determine a motion trajectory of the mobile terminal after the call request is received, according to the plurality of physical parameters; and the first process execution unit is configured to execute a first process when the motion trajectory meets a first preset condition.

Preferably, the first sensing unit is a gravity accelerometer or a gyroscope, and in the case where the first sensing unit is the gravity accelerometer, the physical parameters are three-dimensional acceleration components in a three-dimensional space; and in the case where the first sensing unit is the gyroscope, the physical parameters are three-dimensional displacements of the gyroscope in the three-dimensional space.

Preferably, the first process execution unit includes: a call answering subunit, a brightness adjusting subunit and/or a touch screen closing subunit, the call answering subunit is configured to answer the call request when the motion trajectory meets the first preset condition;

the brightness adjusting subunit is configured to adjust brightness of a display screen of the mobile terminal when the motion trajectory meets the first preset condition; and the touch screen closing subunit is configured to close a screen touching function of a touch screen of the mobile terminal when the motion trajectory meets the first preset condition.

Preferably, the mobile terminal further includes a second sensing unit, and the first process execution unit is configured to:

execute the first process when the motion trajectory meets the first preset condition and a first parameter sensed by the second sensing unit meets a second preset condition.

Preferably, the second sensing unit is a light sensor, the first parameter is an ambient light intensity value, and the second preset condition is that the ambient light intensity value is less than a first threshold.

Preferably, the second sensing unit is a capacitive screen, the first parameter is the induced charge quantity by the capacitive screen, and the second preset condition is that the induced charge quantity by the capacitive screen is greater than a second threshold.

Preferably, the system further includes: a preset condition modification unit configured to: save the motion trajectory; and in the case where a plurality of motion trajectories that have been saved do not meet the first preset condition and their differences from the first preset condition are less than a first difference, modify the first preset condition according to the plurality of motion trajectories.

A mobile terminal, comprising a first sensing unit and an information processing system according to any one of claims 8 to 14, wherein the first sensing unit is connected with the information processing system.

By applying the above technical solutions, the information processing method, system and the mobile terminal provided by the embodiments of the invention can detect a motion trajectory of the mobile terminal after the mobile terminal receives a call request, and execute a first process when the motion trajectory meets a preset condition. It can be seen that, in the invention, whether a user will answer the call request is determined by judging the motion trajectory of the mobile terminal after the call request is received. After it is determined that the user will answer the call request, the processes, such as automatically answering the call request, closing a screen touching function of a touch screen, or adjusting screen brightness, can be executed, so that the user does not need to perform any manual operation anymore, which on one hand, improves execution efficiency, and on the other hand, avoids a misoperation caused by a manual operation, and thereby makes a user feel good when using the mobile terminal.

BRIEF DESCRIPTION OF THE DRAWINGS

Hereinafter, the drawings which are referred to in description of the following embodiments or the prior art will be briefly introduced so as to explain the embodiments of the invention more clearly. Apparently, the drawings described below are merely the embodiments of the invention, and other drawings may be obtained by those skilled in the art based on these drawings without any creative work.

DETAILED DESCRIPTION OF THE INVENTION

In order to make those skilled in the art understanding technical solutions of the invention better, the technical solutions in the embodiments of the invention will be described clearly and completely hereinafter in conjunction with the drawings in the embodiments of the invention. Apparently, the described embodiments are only a part but not all of the embodiments of the invention. All the other embodiments obtained by those skilled in the art without creative effort on the basis of the embodiments of the invention fall within the scope of protection of the invention.

Figure 1:
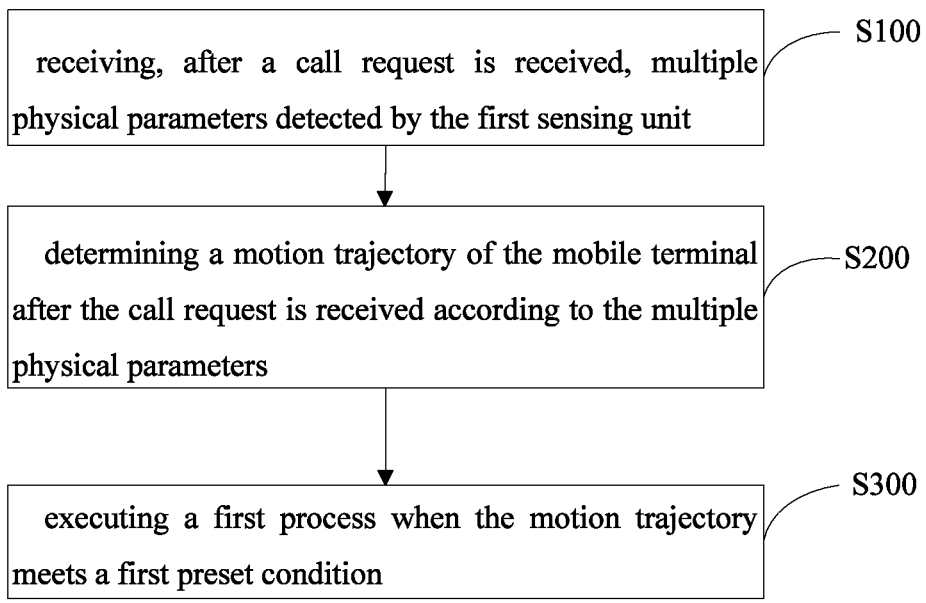
FIG. 1 is a schematic flow chart of an information processing method provided by an embodiment of the invention.

An information processing method provided by an embodiment of the invention is applied to a mobile terminal including a first sensing unit, and as shown in FIG. 1, the method may include the following steps.

S100: receiving, after a call request is received, multiple physical parameters detected by the first sensing unit.

Specifically, the mobile terminal may be a mobile phone, a tablet computer with a call function, a multimedia player with a call function (such as MP3, MP4) and the like.

It may be understood that, the call request may be sent to the mobile terminal via a mobile communication network (such as WCDMA, and GSM), and may also be sent to the mobile terminal via the internet. For example, via the internet, a voice call and a video call can occur between tablet computers iPads from the Apple Company. Another example is that: a computer may also send via the internet a call request to a mobile terminal such as a mobile phone to implement a call.

Specifically, the first sensing unit may include a gravity accelerometer and/or a gyroscope. It may be understood that, the gravity accelerometer can sense three-dimensional acceleration components in a three-dimensional space, thereby allowing the mobile terminal to obtain a corresponding motion trajectory by performing a calculation on the three-dimensional acceleration components in the three-dimensional space sensed by the gravity accelerometer. The gyroscope can directly sense three-dimensional displacements in the three-dimensional space. The first sensing unit may be the gravity accelerometer or the gyroscope, and in the case where the first sensing unit is the gravity accelerometer, the physical parameters are three-dimensional acceleration components in a three-dimensional space; and in the case where the first sensing unit is the gyroscope, the physical parameters are three-dimensional displacements of the gyroscope in the three-dimensional space. The first sensing unit may include both the gravity accelerometer and the gyroscope, so that a first motion trajectory obtained by the gravity accelerometer and a second motion trajectory detected by the gyroscope are processed (such as averaged) to obtain a third motion trajectory with higher accuracy.

Of course, the first sensing unit may be other sensors which can sense an acceleration or a motion trajectory, and the invention does not set a limit herein.

It should be noted that, the multiple physical parameters detected by the first sensing unit may be the same type of physical parameters. For example: in the case where the first sensing unit is the gravity accelerometer, the multiple physical parameters detected by the first sensing unit may be the same type of physical parameters, i.e., three-dimensional acceleration components in a three-dimensional space. It may be understood that, multiple physical parameters of the same type may be sensed during one motion of the mobile terminal controlled by the user.

The multiple physical parameters detected by the first sensing unit may also be different types of physical parameters. For example: in the case where the first sensing unit includes both the gravity accelerometer and the gyroscope, the multiple physical parameters detected by the first sensing unit are different types of physical parameters: three-dimensional acceleration components in a three-dimensional space and three-dimensional displacements of the gyroscope in the three-dimensional space. Of course, during one motion of the mobile terminal controlled by the user, the number of the physical parameters belonging to any one same type in the different types of physical parameters detected by the first sensing unit may also be more than one. For example: in the case where the first sensing unit includes both the gravity accelerometer and the gyroscope, the number of the three-dimensional acceleration components in the three-dimensional space detected by the first sensing unit may be more than one, and the number of the three-dimensional displacements of the gyroscope in the three-dimensional space detected by the first sensing unit may also be more than one.

S200, determining a motion trajectory of the mobile terminal after the call request is received, according to the multiple physical parameters;

It may be understood that, in the case where the multiple physical parameters are three-dimensional acceleration components in the three-dimensional space, a calculation may be performed on the multiple three-dimensional acceleration components in the three-dimensional space, so as to obtain the motion trajectory of the mobile terminal after the call request is received. Particularly, at first, a magnitude of acceleration in the three-dimensional space and a direction of the acceleration in the three-dimensional space may be obtained by performing a calculation according to the three-dimensional acceleration components in the three-dimensional space, and they may be indicated in an acceleration vector form. Then, a motion trajectory of the mobile terminal after the call request is received is obtained by performing a calculation according to multiple acceleration vectors and their duration time.

In the case where the multiple physical parameters are three-dimensional displacements of the gyroscope in the three-dimensional space, a merging process may be performed to the three-dimensional displacements of the gyroscope in the three-dimensional space, so as to obtain a motion trajectory of the mobile terminal after the call request is received.

In the case where the multiple physical parameters include three-dimensional acceleration components in the three-dimensional space and three-dimensional displacements of the gyroscope in the three-dimensional space, a first motion trajectory obtained by performing the calculation on the three-dimensional acceleration components in the three-dimensional space and a second motion trajectory obtained by performing the merging process to the three-dimensional displacements of the gyroscope in the three-dimensional space may be processed to obtain a third motion trajectory with higher accuracy.

S300, executing a first process when the motion trajectory meets a first preset condition.

Particularly, the first preset condition may be a preset motion trajectory range of the mobile terminal, and the motion trajectory range may be a motion trajectory range of the mobile terminal under the control by the user after the mobile terminal receives a call request and before the call is answered.

Specifically, the first process may include: answering the call request. In the case where the first process includes answering the call request, the call request is answered automatically by the mobile terminal, and the user does not need to perform the answering operation any more.

The first process may also include: adjusting brightness of a display screen of the mobile terminal. In the case where the first process includes adjusting brightness of a display screen of the mobile terminal, the mobile terminal may automatically adjust the brightness of the display screen down to save power without the need of a manual operation by the user.

The first process may also include: closing a screen touching function of the touch screen of the mobile terminal. Since a user generally does not need to operate a mobile phone during answering a call, the screen touching function of the touch screen may be closed. It may be understood that, after the screen touching function of the touch screen is closed, a user may be prevented from making a misoperation during answering the call. For example: during the answering of a call, if an ear of the user touches an ending call virtual key on the touch screen, a misoperation will occur, and consequently the call procedure is terminated abnormally.

Of course, the first process may also include any combination of the following three processes: answering the call request, adjusting brightness of a display screen of the mobile terminal, and closing a screen touching function of a touch screen of the mobile terminal.

Of course, the first process may also include other processes, and the invention does not set a limit herein.

It should be noted that, after a call of the mobile terminal is ended, a corresponding effect generated by the first process may be removed, such as the brightness of the display screen is restored to the brightness before answering the call, and the screen touching function of the touch screen is started.

In the information processing method provided by an embodiment of the invention, a motion trajectory of the mobile terminal after the mobile terminal receives a call request can be detected, and then a first process is executed when the motion trajectory meets a preset condition. It can be seen that, in the invention, whether a user will answer the call request is determined by judging the motion trajectory of the mobile terminal after the call request is received. After it is determined that the user will answer the call request, the processes, such as automatically answering the call request, closing a screen touching function of a touch screen, or adjusting screen brightness, can be executed, so that the user does not need to perform any manual operation, which on one hand, improves execution efficiency, and on the other hand, avoids a misoperation caused by a manual operation, and thereby makes a user feel good when using the mobile terminal.

Figure 2:
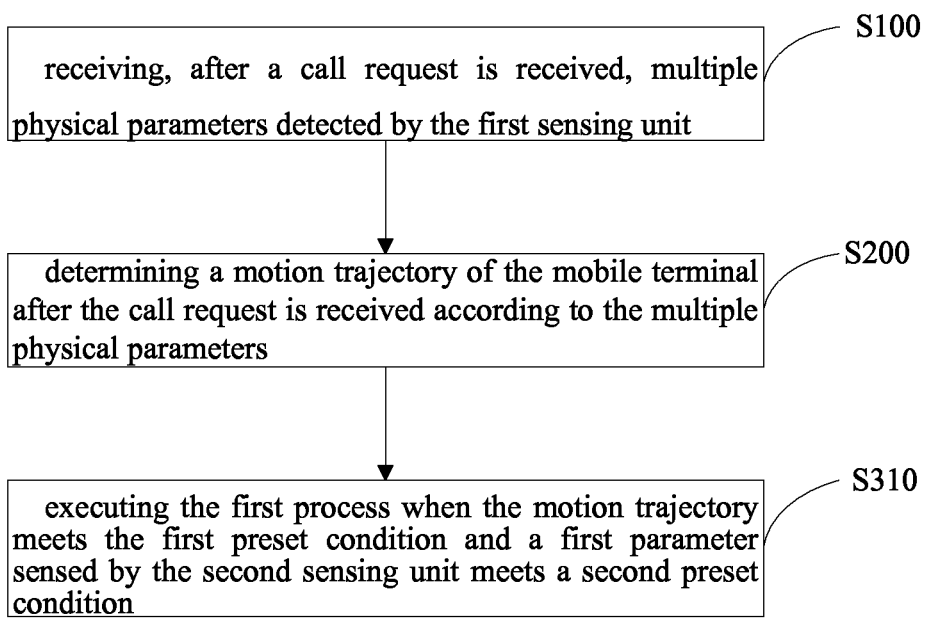
FIG. 2 is a schematic flow chart of another information processing method provided by an embodiment of the invention.

In another information processing method provided by an embodiment of the invention, the mobile terminal may further include a second sensing unit, and as shown in FIG. 2, the step S300 may include:

S310, executing the first process when the motion trajectory meets the first preset condition and a first parameter sensed by the second sensing unit meets a second preset condition.

It may be understood that, in the process that a user answers a call, other sensing units can be further used to determine whether the user will accept a call request. For example: in the process that a user answers a call, the user needs to move a screen of the mobile terminal close to its head, and at this time, a camera or a light sensor at a side of the screen of the mobile terminal will sense less light intensity than before. Moreover, in the case where the screen is a capacitive screen, the screen of the mobile terminal will generate more induced charges. It may be understood that, whether the user will accept the call request may be further determined by any one of the above ways: the way in which the camera is used to sense; the way in which the light sensor is used to sense; and the way in which the capacitive screen is used to sense. Of course, any number of ways from the above ways may also be used simultaneously to determine whether the user will accept the call request, to further ensure accuracy.

Specifically, the second sensing unit may be a light sensor, the first parameter may be an ambient light intensity value, and the second preset condition may be that the ambient light intensity value is less than a first threshold.

The second sensing unit may be a capacitive screen, the first parameter may be the induced charge quantity by the capacitive screen, and the second preset condition may be that the induced charge quantity by the capacitive screen is greater than a second threshold.

Figure 3:
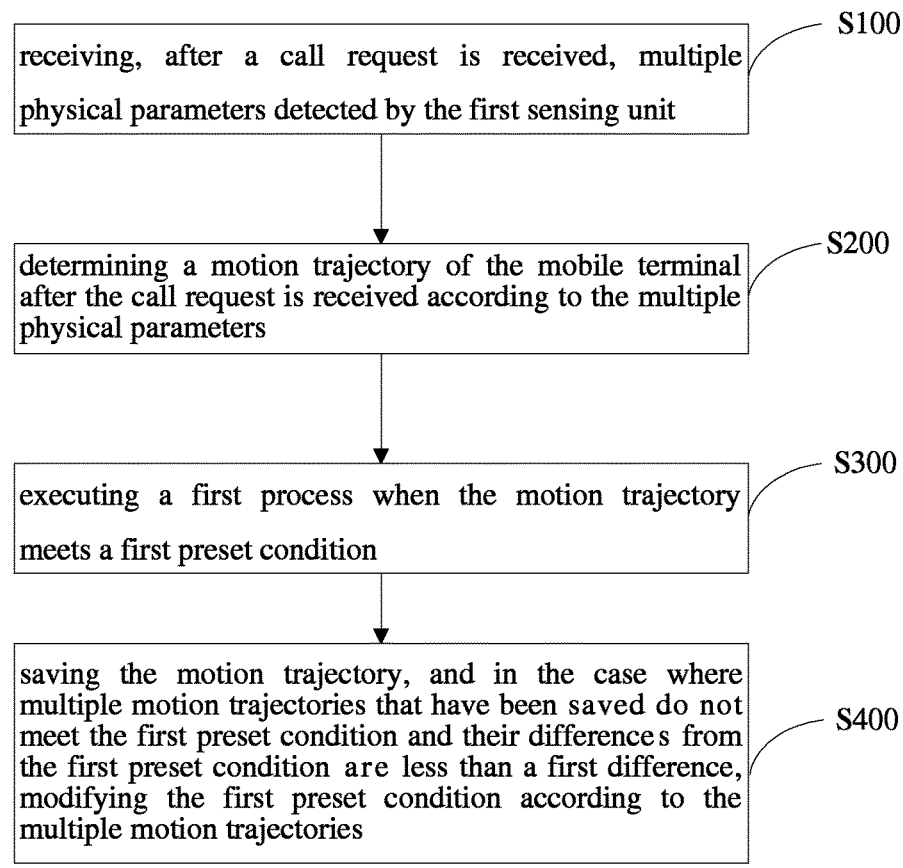
FIG. 3 is a schematic flow chart of another information processing method provided by an embodiment of the invention.

As shown in FIG. 3, another information processing method provided by an embodiment of the invention may further include:

S400, saving the motion trajectory; and in the case where multiple motion trajectories that have been saved do not meet the first preset condition and their differences from the first preset condition are less than a first difference, modifying the first preset condition according to the multiple motion trajectories.

It may be understood that, since each person's motion habit of operating and controlling a mobile terminal at the time of answering a call are not identical, the first preset condition preset for determining a motion trajectory may have a certain difference from a particular motion trajectory of the mobile terminal when the user operates and controls the mobile terminal during answering the call. In this situation, a motion trajectory of the mobile terminal each time the user answers a call may be saved, and when multiple motion trajectories that have been saved do not meet the first preset condition and their differences from the first preset condition are less than a first difference, the first preset condition is modified according to the multiple motion trajectories, to make the first preset condition conform to the user's motion habit better.

It should be noted that, the reason why the differences between the saved motion trajectories and the first preset condition must be less than the first difference is to prevent other actions (such as shaking the mobile terminal left and right to switch between songs) from being incorrectly deemed as a motion trajectory of the mobile terminal when a call is answered.

Corresponding to the above method embodiment, the invention further provides an information processing system.

Figure 4:
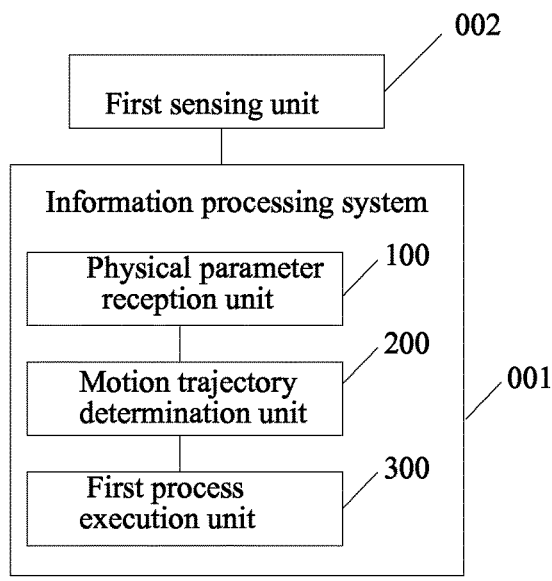
FIG. 4 is a schematic structure diagram of an information processing system provided by an embodiment of the invention.

As shown in FIG. 4, an information processing system 001 provided by an embodiment of the invention is included in a mobile terminal including a first sensing unit 002, the information processing system 001 may include: a physical parameter reception unit 100, a motion trajectory determination unit 200 and a first process execution unit 300, the physical parameter reception unit 100 is configured to receive, after a call request is received, multiple physical parameters detected by the first sensing unit.

Specifically, the mobile terminal may be a mobile phone, a tablet computer with a call function, a multimedia player with a call function (such as MP3, and MP4) and the like.

It may be understood that, the call request may be sent to the mobile terminal via a mobile communication network (such as WCDMA, and GSM), and may also be sent to the mobile terminal via the internet. For example, via the internet, a voice call and a video call can occur between tablet computers iPads from the Apple Company. Another example is that: a computer may also, send via the internet a call request to a mobile terminal such as a mobile phone to implement a call.

Specifically, the first sensing unit may include a gravity accelerometer and/or a gyroscope. It may be understood that, the gravity accelerometer can sense three-dimensional acceleration components in a three-dimensional space, and thereby the mobile terminal is allowed to obtain a corresponding motion trajectory by performing a calculation to the three-dimensional acceleration components in the three-dimensional space sensed by the gravity accelerometer. The gyroscope can directly sense three-dimensional displacements in the three-dimensional space. The first sensing unit may be the gravity accelerometer or the gyroscope, and in the case where the first sensing unit is the gravity accelerometer, the physical parameters are three-dimensional acceleration components in a three-dimensional space; and in the case where the first sensing unit is the gyroscope, the physical parameters are three-dimensional displacements of the gyroscope in the three-dimensional space. The first sensing unit may include both the gravity accelerometer and the gyroscope, so that a first motion trajectory obtained by the gravity accelerometer and a second motion trajectory detected by the gyroscope are processed (such as averaged) to obtain a third motion trajectory with higher accuracy.

Of course, the first sensing unit may be other sensors which can sense an acceleration or a motion trajectory, and the invention does not set a limit herein.

It should be noted that, the multiple physical parameters detected by the first sensing unit may be the same type of physical parameters. For example: in the case where the first sensing unit is the gravity accelerometer, the multiple physical parameters detected by the first sensing unit may be the same type of physical parameters, i.e., three-dimensional acceleration components in a three-dimensional space. It may be understood that, multiple physical parameters of the same type may be sensed during one motion of the mobile terminal controlled by the user.

The multiple physical parameters detected by the first sensing unit may also be different types of physical parameters. For example: in the case where the first sensing unit includes both the gravity accelerometer and the gyroscope, the multiple physical parameters detected by the first sensing unit are different types of physical parameters: three-dimensional acceleration components in a three-dimensional space and three-dimensional displacements of the gyroscope in the three-dimensional space. Of course, during one motion of the mobile terminal controlled by the user, the number of the physical parameters belonging to any one same type in the different types of physical parameters detected by the first sensing unit may also be more than one. For example: in the case where the first sensing unit includes both the gravity accelerometer and the gyroscope, the number of the three-dimensional acceleration components in the three-dimensional space detected by the first sensing unit may be more than one, and the number of the three-dimensional displacements of the gyroscope in the three-dimensional space detected by the first sensing unit may also be more than one.

The motion trajectory determination unit 200 is configured to determine a motion trajectory of the mobile terminal after the call request is received, according to the multiple physical parameters.

It may be understood that, in the case where the multiple physical parameters are three-dimensional acceleration components in the three-dimensional space, a calculation may be performed to the multiple three-dimensional acceleration components in the three-dimensional space, so as to obtain the motion trajectory of the mobile terminal after the call request is received. Particularly, at first, a magnitude of acceleration in the three-dimensional space and a direction of the acceleration in the three-dimensional space may be obtained by performing a calculation according to the three-dimensional acceleration components in the three-dimensional space, and they may be indicated in an acceleration vector form. Then, a motion trajectory of the mobile terminal after the call request is received is obtained by performing a calculation according to multiple acceleration vectors and their duration time.

In the case where the multiple physical parameters are three-dimensional displacements of the gyroscope in the three-dimensional space, a merging process may be performed to the three-dimensional displacements of the gyroscope in the three-dimensional space, so as to obtain a motion trajectory of the mobile terminal after the call request is received.

In the case where the multiple physical parameters include three-dimensional acceleration components in the three-dimensional space and three-dimensional displacements of the gyroscope in the three-dimensional space, a first motion trajectory obtained by performing the calculation to the three-dimensional acceleration components in the three-dimensional space and a second motion trajectory obtained by performing the merging process to the three-dimensional displacements of the gyroscope in the three-dimensional space may be processed to obtain a third motion trajectory with higher accuracy.

The first process execution unit 300 is configured to execute a first process when the motion trajectory meets a first preset condition Particularly, the first preset condition may be a preset motion trajectory range of the mobile terminal, and the motion trajectory range may be a motion trajectory range of the mobile terminal under the control of the user after the mobile terminal receives a call request and before the call is answered.

The first process execution unit may include: a call answering subunit configured to answer the call request when the motion trajectory meets the first preset condition. In the case where the first process execution unit includes a call answering subunit, the call request is answered automatically by the mobile terminal, and the user does not need to perform the answering operation anymore.

The first process execution unit may further include: a brightness adjusting subunit configured to adjust brightness of a display screen of the mobile terminal when the motion trajectory meets the first preset condition. In the case where the first process execution subunit includes a brightness adjusting subunit, the mobile terminal may automatically adjust the brightness of the display screen down to save power without manual operations by the user.

The first process execution unit may also include: a touch screen closing subunit configured to close a screen touching function of a touch screen of the mobile terminal when the motion trajectory meets the first preset condition. Since a user generally does not need to operate a mobile phone during answering a call, the screen touching function of the touch screen may be closed. It may be understood that, after the screen touching function of the touch screen is closed, a user may be prevented from making a misoperation during answering the call. For example: during the answering of a call, if an ear of the user touches an ending call virtual key on the touch screen, a misoperation will occur, and consequently the call procedure is terminated abnormally.

Of course, the first process execution unit may further include any combination of the call answering subunit, the brightness adjusting subunit and the touch screen closing subunit.

It should be noted that, after a call of the mobile terminal is ended, a corresponding effect generated by the first process may be removed, such as the brightness of the display screen is restored to the brightness before answering the call, and the screen touching function of the touch screen is started.

In the information processing system provided by an embodiment of the invention, a motion trajectory of the mobile terminal after the mobile terminal receives a call request can be detected, and then a first process is executed when the motion trajectory meets a preset condition. It can be seen that, in the invention, whether a user will answer the call request is determined by judging the motion trajectory of the mobile terminal after the call request is received. After it is determined that the user will answer the call request, the processes, such as automatically answering the call request, closing a screen touching function of a touch screen, or adjusting screen brightness, can be executed, so that the user does not need to perform any manual operation, which on one hand, improves execution efficiency, and on the other hand, avoids a misoperation caused by a manual operation, and thereby makes a user feel good when using the mobile terminal.

In another information processing system provided by an embodiment of the invention, the mobile terminal may further include a second sensing unit, and the first process execution unit 300 can be configured to:

execute the first process when the motion trajectory meets the first preset condition and a first parameter sensed by the second sensing unit meets a second preset condition.

It may be understood that, in the process that a user answers a call, other sensing units can be further used to determine whether the user will accept a call request. For example: in the process that a user answers a call, the user needs to move a screen of the mobile terminal close to its head, and at this time, a camera or a light sensor at a side of the screen of the mobile terminal will sense less light intensity than before. Moreover, in the case where the screen is a capacitive screen, the screen of the mobile terminal will generate more induced charges. It may be understood that, whether the user will accept the call request may be further determined by any one of the above ways: the way in which the camera is used to sense; the way in which the light sensor is used to sense; and the way in which the capacitive screen is used to sense. Of course, any number of ways from the above ways may also be used simultaneously to determine whether the user will accept the call request, to further ensure accuracy.

Specifically, the second sensing unit may be a light sensor, the first parameter may be an ambient light intensity value, and the second preset condition may be that the ambient light intensity value is less than a first threshold.

The second sensing unit may be a capacitive screen, the first parameter may be the induced charge quantity by the capacitive screen, and the second preset condition may be that the induced charge quantity by the capacitive screen is greater than a second threshold.

Figure 5:
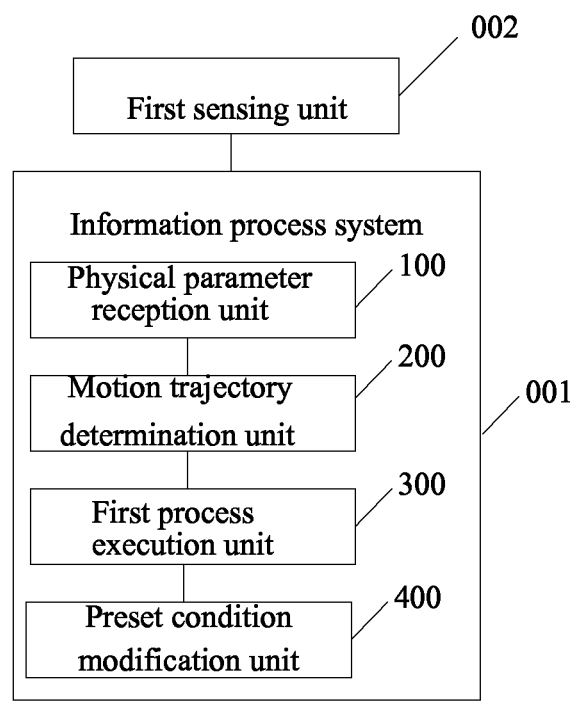
FIG. 5 is a schematic structure diagram of another information processing system provided by an embodiment of the invention.

As shown in FIG. 5, another information processing system provided by an embodiment of the invention may further include a preset condition modification unit 400 configured to: save the motion trajectory; and in the case where multiple motion trajectories that have been saved do not meet the first preset condition and their difference from the first preset condition are less than a first difference, modify the first preset condition according to the multiple motion trajectories.

It may be understood that, since each person's motion habit of operating and controlling a mobile terminal at the time of answering a call are not identical, the first preset condition preset for determining a motion trajectory may have a certain difference from a particular motion trajectory of the mobile terminal when the user operates and controls the mobile terminal during answering the call. In this situation, a motion trajectory of the mobile terminal at each time when the user answers a call may be saved, and when multiple motion trajectories that have been saved do not meet the first preset condition and their difference from the first preset condition are less than a first difference, the first preset condition is modified according to the multiple motion trajectories, to make the first preset condition conform to the user's motion habit better.

It should be noted that, the reason why the difference between the saved motion trajectories and the first preset condition must be less than the first difference is to prevent other actions (such as shaking the mobile terminal to left and right to switch between songs) from being incorrectly deemed as a motion trajectory of the mobile terminal when a call is answered.

An embodiment of the invention further provides a mobile terminal including a first sensing unit and an information processing system, with the first sensing unit being connected with the information processing system. For the structure of the information processing system, one can refer to the content of embodiments of the information processing system described above.

For ease of description, the devices described above are described in a way in which the devices are divided into various units according to functions. Practically, the functions of the various units may be implemented in the same or multiple software and/or hardware in implementing the invention.

As can be seen from the above description of the embodiments, it can be understood clearly by those skilled in the art that the invention can be implemented by software together with a necessary common hardware platform. Based on such understanding, the essence of the technical solution of the invention or the part of the technical solution of the invention that contributes to the prior art can be embodied as a software product, which can be stored in the storage medium, such as ROM/RAM, magnetic disk, optical disk, and include several instructions configured to cause a computer device (such as a personal computer, a server, or a network device) to implement the method described in all or some of the embodiments of the invention.

In the present specification, the embodiments are described in progression, each embodiment mainly focuses on its different aspect from other embodiments, and reference can be made to these similar parts among the embodiments. For the device embodiment, since it corresponds to the embodiment method substantially, the description of the device embodiment is relatively simple, and the reference can be made to the description of the method embodiment for the related portion. The embodiments of the system described above are illustrative, in which the units that are described as a separate component can be or not be separated physically, and the components that are shown as a unit can be or not be a physical unit, that is to say, can be positioned in one place, or be distributed onto multiple network units. Some or all the modules can be selected as required in practice to achieve the purpose of the solution in the embodiment. All of these can be understood and implemented by those skilled in the art without creative labor.

The invention can be applied to many common or dedicated computing system circumstances or configurations, such as personal computer, server computer, handheld device or portable device, tablet device, multi-processor system, microprocessor based system, set top box, programmable consumer electronic device, network PC, mini-computer, large computer, or a distributed computing circumstance including any of the above system or device.

The invention can be described in the general context of a computer executable instruction that is executed by a computer, such as a program module. Generally, the program module includes a routine, a program, an object, a component, a data structure or the like which is configured to carried out a specific task or achieve specific abstract data type. The invention can also be practiced in the distributed computing circumstance, in which the task is carried out by a remote processing device that is connected via a communication network. In the distributed network circumstance, the program module can be provided in the local and remote computer storage medium which includes the storage device.

It is necessary not be noted that, in the invention, relation terms such as "first" and "second" are used only to distinguish one entity or operation from the other entity or operation, and not sure to demand or indicate that there are those actual relations or orders among those entities and operations.

The above are only embodiments of the invention. It should be noted that many modifications and alternations can be made by those ordinary skilled in the art without deviating from the principle of the invention, and these modifications and alternations should be deemed as falling within the scope of protection of the invention.

The invention claimed is:

1. An information processing method applied to a mobile terminal, the mobile terminal comprising a first sensing unit, the method comprising:
   receiving, after a call request is received, a plurality of physical parameters detected by the first sensing unit;
   determining a motion trajectory of the mobile terminal after the call request is received, according to the plurality of physical parameters;
   executing a first process when the motion trajectory meets a first preset condition;
   wherein the mobile terminal further comprises a second sensing unit, and the step of executing a first process when the motion trajectory meets a first preset condition comprises: executing the first process when the motion trajectory meets the first preset condition and a first parameter sensed by the second sensing unit meets a second preset condition, wherein the first parameter is only used for further determining whether to execute the first process after it is determined that the motion trajectory meets the first preset condition.

2. The method according to claim 1, wherein the first sensing unit is a gravity accelerometer or a gyroscope, and in the case where the first sensing unit is the gravity accelerometer, the physical parameters are three-dimensional acceleration components in a three-dimensional space; and in the case where the first sensing unit is the gyroscope, the physical parameters are three-dimensional displacements of the gyroscope in the three-dimensional space.

3. The method according to claim 2, wherein the first process comprises:
   answering the call request, adjusting brightness of a display screen of the mobile terminal, and/or
closing a screen touching function of a touch screen of the mobile terminal.

4. The method according to claim 2, wherein, the mobile terminal further comprises a second sensing unit, and the step of executing a first process when the motion trajectory meets a first preset condition comprises:
executing the first process when the motion trajectory meets the first preset condition and a first parameter sensed by the second sensing unit meets a second preset condition.

5. The method according to claim 2, further comprising:
saving the motion trajectory; and in the case where a plurality of motion trajectories that have been saved do not meet the first preset condition and their differences from the first preset condition are less than a first difference, modifying the first preset condition according to the plurality of motion trajectories.

6. The method according to claim 1, wherein, the first process comprises:
answering the call request, adjusting brightness of a display screen of the mobile terminal,
and/or
closing a screen touching function of a touch screen of the mobile terminal.

7. The method according to claim 1, wherein, the second sensing unit is a light sensor, the first parameter is an ambient light intensity value, and the second preset condition is that the ambient light intensity value is less than a first threshold.

8. The method according to claim 1, wherein, the second sensing unit is a capacitive screen, the first parameter is the induced charge quantity by the capacitive screen, and the second preset condition is that the induced charge quantity by the capacitive screen is greater than a second threshold.

9. The method according to claim 1, further comprising:
saving the motion trajectory; and in the case where a plurality of motion trajectories that have been saved do not meet the first preset condition and their differences from the first preset condition are less than a first difference, modifying the first preset condition according to the plurality of motion trajectories.

10. An information processing system comprised in a mobile terminal, the mobile terminal comprising a first sensing unit, the system comprising: a physical parameter reception unit, a motion trajectory determination unit and a first process execution unit,
wherein,
the physical parameter reception unit is configured to receive, after a call request is received, a plurality of physical parameters detected by the first sensing unit;
the motion trajectory determination unit is configured to determine a motion trajectory of the mobile terminal after the call request is received, according to the plurality of physical parameters;
the first process execution unit is configured to execute a first process when the motion trajectory meets a first preset condition; and
wherein the mobile terminal further comprises a second sensing unit, and the step of executing a first process when the motion trajectory meets a first preset condition comprises: executing the first process when the motion trajectory meets the first preset condition and a first parameter sensed by the second sensing unit meets a second preset condition, wherein the first parameter is only used for further determining whether to execute the first process after it is determined that the motion trajectory meets the first preset condition.

11. The system according to claim 10, wherein, the first sensing unit is a gravity accelerometer or a gyroscope, and in the case where the first sensing unit is the gravity accelerometer, the physical parameters are three-dimensional acceleration components in a three-dimensional space; and in the case where the first sensing unit is the gyroscope, the physical parameters are three-dimensional displacements of the gyroscope in the three-dimensional space.

12. The system according to claim 11, wherein, the first process execution unit comprises: a call answering subunit, a brightness adjusting subunit and/or a touch screen closing subunit, wherein,
the call answering subunit is configured to answer the call request when the motion trajectory meets the first preset condition;
the brightness adjusting subunit is configured to adjust brightness of a display screen of the mobile terminal when the motion trajectory meets the first preset condition; and
the touch screen closing subunit is configured to close a screen touching function of a touch screen of the mobile terminal when the motion trajectory meets the first preset condition.

13. The system according to claim 11, wherein, the mobile terminal further comprises a second sensing unit, and the first process execution unit is configured to:
execute the first process when the motion trajectory meets the first preset condition and a first parameter sensed by the second sensing unit meets a second preset condition.

14. The system according to claim 10, wherein, the first process execution unit comprises: a call answering subunit, a brightness adjusting subunit and/or a touch screen closing subunit, wherein,
the call answering subunit is configured to answer the call request when the motion trajectory meets the first preset condition;
the brightness adjusting subunit is configured to adjust brightness of a display screen of the mobile terminal when the motion trajectory meets the first preset condition; and
the touch screen closing subunit is configured to close a screen touching function of a touch screen of the mobile terminal when the motion trajectory meets the first preset condition.

15. The system according to claim 10, wherein, the second sensing unit is a light sensor, the first parameter is an ambient light intensity value, and the second preset condition is that the ambient light intensity value is less than a first threshold.

16. The system according to claim 10, wherein, the second sensing unit is a capacitive screen, the first parameter is the induced charge quantity by the capacitive screen, and the second preset condition is that the induced charge quantity by the capacitive screen is greater than a second threshold.

17. The system according to claim 10, further comprising:
a preset condition modification unit configured to: save the motion trajectory; and in the case where a plurality of motion trajectories that have been saved do not meet the first preset condition and their differences from the first preset condition are less than a first difference, modify the first preset condition according to the plurality of motion trajectories.

18. The system according to claim 10, further comprising the mobile terminal with the first sensing unit, wherein, the first sensing unit is connected with the information processing system.

* * * * *